United States Patent Office 3,520,850
Patented July 21, 1970

3,520,850
PROCESS FOR POLYMERIZING HALOGENATED KETONES WITH FORMALDEHYDE
Kornel D. Kiss, University Heights, Ohio, assignor to Diamond Shamrock Corporation, Cleveland, Ohio, a corporation of Delaware
No Drawing. Filed Mar. 16, 1964, Ser. No. 352,305
Int. Cl. C08g 3/00
U.S. Cl. 260—64                                   7 Claims

ABSTRACT OF THE DISCLOSURE

Useful easily workable and thermally stable copolymer compositions having a high degree of fire retardance are prepared by copolymerizing a mixture of 80 to 99.9 mol percent of formaldehyde and 0.1 to 20 mol percent of a halogenated propanone. Suitable halogenated propanones include hexafluoroacetone, tetrafluoroacetone, hexachloroacetone, tetrachloroacetone, 1,3-dichloro-2-propanone, and tetrafluorodichloroacetone. The copolymerization is conducted under substantially anhydrous conditions in an inert organic liquid at a temperature in the range of −80° C. to 30° C. for a period of about 1 to 20 hours. Typical catalysts employed in the process are alkali metals alkoxides of alkali metals, and organo metallic compounds.

---

This invention relates to novel thermoplastic compositions of matter. More particularly, it relates to halogen-containing oxymethylene copolymers and to the process for preparing these compositions.

It is now well known to prepare oxymethylene homopolymers by polymerizing either formaldehyde, trioxane or other oligomers of formaldehyde in the presence of certain polymerization initiators or catalysts, preferably under substantially anhydrous conditions. These polymers, which are thermoplastic materials composed of recurring oxymethylene —CH$_2$O— units joined together in linear chains terminated at one or both ends by thermally-unstable hydroxyl groups, may vary widely in thermal stability depending upon the method of preparation. Polyoxymethylenes of high average polymer molecular weight are known to be more stable against thermal degradation than those of lower molecular weight. However, even high molecular weight oxymethylene polymers typically will be degraded or decomposed in varying degrees when exposed to elevated processing temperatures. To minimize degradation, therefore, these materials prior to being processed are usually further treated such as by chain end-group "capping," i.e., by converting the unstable hydroxyl end-groups to more stable ester or ether groups and/or by incorporating additives therewith which may inhibit polymer degradation to a substantial degree.

It is an object of this invention to provide thermoplastic, easily processable polymeric compositions structurally related to polyoxymethylene but having an improved resistance to thermal degradation.

It is another object of this invention to provide a composition which suitable may be employed to prepare tough and durable plastic articles such as films, moldings, extrusions and the like.

It is still another object of this invention to provide tough and durable plastic articles, such as described above, from an easily processed, thermally stable oxymethylene copolymer compositions.

These and other objects of this invention are accomplished by polymerizing, under substantially anhydrous conditions and in the presence of an ionic-type polymerization catalyst, formaldehyde with a halogenated propanone having the structure (I)  

wherein X is halogen, i.e., fluorine, chlorine, bromine or iodine; Y is selected from the group consisting of hydrogen and a halogen different from X; $a$ is a 0 to 3, inclusive; and $b$ is 1 to 3, inclusive.

Specific halogenated propanone monomers which suitably may be employed in combination with formaldehyde to prepare the copolymers of this invention include fluorinated propanone derivatives such as hexafluoroacetone, tetrafluoroacetone, etc.; chlorinated propanone derivatives such as hexachloroacetone, tetrachloroacetone, 1,3-dichloro-2-propanone, and the like; propanone derivatives containing both fluorine and chlorine, e.g., tetrafluorodichloroacetone; and similar bromine and iodine-substituted acetones. Of these the preferred propanone derivatives are the fluoro-, chloro- and fluorochloro-substituted acetones, with the fluoro-substituted acetones, e.g., hexafluoroacetone or tetrafluoroacetone, being especially preferred.

More specifically, the present invention involves the preparation of useful, easily workable and thermally stable oxymethylene copolymer compositions also having a high degree of fire retardance by polymerizing, under conditions as stated above, a monomeric mixture containing from about 80 up to 99.9 mol percent of formaldehyde and from about 0.1 up to 20 mol percent of a halogenated propanone monomer corresponding to the above structure, said process being conducted at a temperature within the range of −80° to +30° C.

The copolymer products obtained are solid, medium to high molecular weight materials which may be fabricated by conventional processing techniques to finished plastic articles, these copolymers exhibiting an improved resistance to thermal degradation by comparison to oxymethylene homopolymers similarly prepared and processed.

In addition to the thermal stability of the copolymers as observed during processing operations and which will be described hereinafter by specific examples, the thermal stability of these materials is likewise determined by thermogravimetric analysis, i.e., by measuring the constant rate at which they degrade at an elevated temperature at which degradation can be easily and accurately measured. This method is well known in the art as generally practiced and, as employed herein, involves heating in an inert atmosphere a prescribed quantity of the copolymer in an oven maintained at 220° C., measuring and recording the weight loss or degradation of the copolymer at intervals during the heat exposure period, and then plotting the logarithm of the weight percent of the remaining undegraded copolymer versus the corresponding times of oven exposure. A decomposition curve drawn through the plotted values indicates that the copolymer degrades initially at a very fast rate after which it degrades at a much slower rate through a major portion of the degradation period, which latter period characterizes the true nature of the copolymer. Accordingly, the reaction rate constant for thermal degradation of the copolymers of this invention is selected from that portion of the degradation curve which represents the weight loss of the copolymer after the initial decomposition is completed, and this value is expressed as weight percent per minute.

It is believed that, in the copolymerization reaction, the halogenated propanone monomer may be incorporated into the copolymer chain by addition through its carbonyl (C=O) bond so that the resulting copolymer product contains recurring oxymethylene groups or units interspersed with recurring units derived from the halogenated propanone monomer which have the following structure:

(II)

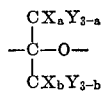

wherein X is halogen, i.e., fluorine, chlorine, bromine or iodine; Y is selected from the group consisting of hydrogen and halogen different from X; $a$ is 0 to 3, inclusive; and $b$ is 1 to 3, inclusive.

In the copolymer chain, the recurring units derived from the halogenated propanone monomer, as structurally represented above, may be interspersed singly between recurring oxymethylene units and may likewise be present therein as comonomer blocks, i.e., segments of a chain comprising at least two of the said halogenated propanone monomer units sequentially joined together with no oxymethylene unit between them.

As determined by similar test procedures, the copolymers of this invention have melting points which are, in most instances, substantially lower than that of oxymethylene homopolymers, i.e., these copolymers have melting points usually within the range of about 155° to 165° C., whereas similarly prepared homopolymers have melting points of 185° to 186° C. Of particular advantage is the fact that these copolymers oftentimes exhibit softening points still lower than their melting points and thus may be processed at substantially lower temperatures and over a less critical temperature range than is possible when processing oxymethylene homopolymers.

The improved thermal stability exhibited by the copolymers is indeed surprising since one would not normally expect such an improvement in an oxymethylene copolymer composition which contains, along with oxymethylene units, monomer units which likewise introduce into the copolymer chain thermally unstable carbon-to-oxygen linkages rather than more thermally stable carbon-to-carbon linkages. Although we do not wish to be bound by any particular theory regarding the thermal stability differences observed between carbon and oxygen linkages derived from halogenated propanones and those derived from formaldehyde, it is believed that hydrogen bonding between hydrogen and halogen atoms in the copolymer chain may exert a stabilizing influence on the copolymer at the processing temperatures employed. In addition to the stabilizing effects of such hydrogen bonding, the fact that these copolymers can be satisfactorily processed at substantially lower temperatures than oxymethylene homopolymers is likewise believed to contribute to their improved thermal stability characteristics. Accordingly, it is possible to process the novel copolymers of this invention, as prepared, without first further stabilizing them, i.e., as by chain end-group "capping" and/or by incorporating stabilizing additives therewith. However, it is to be understood that the copolymers may be so stabilized prior to processing, if desired, without departing from the intended scope of this invention.

The copolymer products of this invention generally may contain from about 0.1 to 20 mol percent of halogenated propanone monomer units which percentage is determined by elemental halogen analysis of the copolymers. That is to say, the copolymers may contain from about 0.1 up to 20 percent of recurring units derived from the said halogenated propanone monomer and from about 80 up to about 99.9 percent of recurring oxymethylene units. The preferred copolymers contain from about 0.1 up to 10 percent of recurring units derived from the said halogenated propanone monomer and from about 90 up to 99.9 percent of recurring oxymethylene units.

The copolymerization reaction is effected in the presence of an ionic-type catalyst selected from compounds such as alkali metals, e.g., lithium, sodium, potassium and the like; alkoxides of alkali metals such as the methoxides, tertiary butoxides, etc. of lithium, sodium or potassium; and organometallic compounds such as butyl lithium, diethyl zinc, tributyl boron, phenyl magnesium bromides, ethyl aluminum dichloride and the like. Alkali metal catalysts may be employed in either the solid state or as dispersions in saturated hydrocarbons. The alkali metal alkoxides and the organometallic compounds are typically employed as solutions in suitable solvents. In general, the amount of catalyst employed in the process may vary from about 0.001 to 10 millimols per liter of reaction medium. However, it is preferable to employ about 0.005 to 8 millimols of catalyst per liter.

The copolymerization reaction is normally conducted in any inert, anhydrous organic liquid which is a solvent for the monomer and for the catalyst and which is a liquid at the reaction temperature. Suitable solvents include aliphatic, cycloaliphatic and aromatic hydrocarbons, especially such hydrocarbons which contain from 3 to 12 carbon atoms per molecule, e.g., n-heptane, cyclohexane, toluene and the like. Typically, a ratio of 3 to 25 parts solvent for each part of formaldehyde is employed in the reaction.

As it is expedient that the copolymerization process be conducted under anhydrous or substantially anhydrous conditions, a catalyst solution employed is prepared and then kept prior to use in a nitrogen atmosphere. Likewise, the liquid reaction medium is dried prior to use and the process is carried out entirely under nitrogen.

In carrying out the reaction, temperatures ranging from about −80° C. to +30° C and reaction times of about 1 hour to 20 hours generally may be employed. However, reaction temperature ranging from −70° to +10° C. and reaction times of 2 to 5 hours generally have been satisfactory and are preferred.

Upon completion of the reaction, the copolymerization mixture is filtered to recover the product precipitate. Prior to drying the product may be purified by leaching with acetone to remove any unreacted monomer remaining. Additionally, the copolymer product may be heated briefly at a temperature of 100° to about 130° C. to decompose any loose unstable chain ends.

As shown hereinafter by specific examples, the novel copolymers of this invention exhibit improved thermal stability characteristics by comparison to unstabilized polyoxymethylenes prepared by similar processes, which materials decompose rapidly when subjected to elevated fabricating temperatures required. As previously pointed out, such improved thermal stability characteristics are totally unexpected in copolymers containing only carbon-to-oxygen linkages.

The copolymer products of this invention may be used to prepare articles such as moldings, films, sheets, rods, tubes, fibers, filaments and the like by conventional molding, casting and/or extrusion processes such as are practiced at the present time. The finished plastic articles which are snow white and translucent to opaque in appearance, exhibit generally the excellent physical and chemical properties typical of articles fabricated from oxymethylene homopolymers. Because of their halogen content, the articles likewise exhibit a high degree of fire retardance. In processing, the copolymers may be used unmodified or, if desired, may have incorporated therewith additives such as antioxidants, fillers, pigments, stabilizers, processing aids and the like which are oftentimes employed when processing such thermoplastic materials.

In order that those skilled in the art may more completely understand the present invention and the preferred methods by which the same may be carried into effect, the following specific examples are offered.

EXAMPLE 1

A one-liter, four-necked polymerization flask is fitted with an agitator, a thermometer well, a reflux condenser, a rubber serum cap for catalyst injection and with inlet and outlet tubes for passage of nitrogen and formaldehyde vapors. An electrically-heated flask used as a pyrolyzer to supply formaldehyde monomer to the polymerizer is fitted with a thermometer and gas inlet and outlet tubes and is connected to the polymerization flask. After nitrogen purging of the apparatus assembly, 85 g. of trioxymethylene (reagent grade) is charged to the pyrolyzer, 500 ml. of anhydrous n-heptane to the polymerization flask and agitation is started. While nitrogen purging is continued, the flask and solvent are cooled to $-70°$ C. Ten ml. of hexafluoroacetone gas is then added to the flask below the surface of the liquid, 2 ml. of butyl lithium catalyst (a one-molar solution in n-heptane) is injected, and formaldehyde vapors generated from the pyrolyzer are introduced into the polymerization mixture below the surface of the liquid. Formaldehyde generation is continued for a 4-hour period, during which time period the reaction mixture is warmed gradually to a temperature of $-27°$ C. The reaction is then stopped, the reaction mixture is discharged from the polymerizer and the product precipitate is separated therefrom by filtration. The isolated product is washed well with acetone, refiltered and finally dried at about 50° C. under vacuum. There is recovered about 77 g. of a very fine, snow-white polymeric material which contains 6.1 mol percent of hexafluoroacetone units, as determined by elemental fluorine analysis. This product begins to soften at about 140° C., has a melting point of 167° to 168° C. and, with continued heating, exhibits substantial stability up to approximately 230° C. The copolymer, as prepared, has a reaction rate constant for thermal degradation at 220° C. of 2.1 weight percent per minute, 90 percent of the copolymer remaining stable after the initial decomposition is completed. Portions of the copolymer are molded for 1 minute at 170° C. under a pressure of 4000 p.s.i. No polymer is lost by decomposition during molding. The tough and rigid specimen moldings obtained, which are snow white in appearance and show no evidence of thermal degradation, exhibit the following properties:

Tensile strength, p.s.i. _____ 8200
Tensile modulus, p.s.i. _____ 235,300
Elongation, percent (ASTM D638–61T) _____ 12
Izod impact strength, ft./lbs./inch of notch (ASTM D256–56) _____ 0.88
Hardness, Rockwell M (ASTM D785–62) _____ 76

EXAMPLE 2

To illustrate the improved resistance to thermal degradation exhibited by the copolymers of this invention by comparison to unstabilized polyoxymethylene which is similarly prepared and tested, an oxymethylene homopolymer is prepared following the general procedure as outlined in Example 1. In this example, the reaction is carried out for a period of 4½ hours, during which time period the reaction mixture gradually warms to a temperature of $-50°$ C. and is warmed further by gentle heating to a final temperature of $+60°$ C. At the end of the reaction period, the reaction mixture is cooled, then discharged from the polymerizer and the polymeric product is isolated, purified and dried as described in Example 1. Ten and four-tenths g. of oxymethylene polymer is recovered. This polymer melts sharply at 186° C. When tested for thermal stability as previously described, it exhibits a reaction rate constant for thermal degradation at 220° C. of 3.5 weight percent per minute, decomposing at a steady, rapid rate throughout the test period. The material is completely decomposed and disappears about 35 minutes after the test has started. When the polymer is molded at 190° C., as described in Example 1, badly distorted dull pieces of opaque material are obtained. These pieces are brittle and appear somewhat porous in nature as if partially foamed by gaseous formaldehyde monomer evolved by decomposition of the polymer during heating.

EXAMPLE 3

Following the general procedure as outlined in Example 1 and using the same apparatus, a copolymer is prepared employing, in combination with formaldehyde, 5 ml. of tetrafluorodichloroacetone monomer. In this example, the reaction is conducted for a period of 4½ hours. During this time, the reaction mixture which is maintained at $-70°$ C. initially, gradually warms to a final temperature of $+23°$ C. After isolating, purifying and drying the product as described in Example 1, there is recovered 40.5 g. of a very fine, white polymeric material which contains 2.7 mol percent of tetrafluorodichloroacetone units, as determined by elemental fluorine analysis. This copolymer melts at approximately 163° C. and, with continued heating, shows stability up to about 300° C. Portions of the copolymer are molded for 1 minute at 180° C. and under a pressure of 4000 p.s.i. Tough, rigid moldings are obtained which are similar in appearance and physical properties to the molded products of Example 1.

EXAMPLE 4

Employing the same general procedure and apparatus as outlined in Example 1, a copolymer is prepared using, in combination with formaldehyde, 5 g. of 1,3-dichloro-2-propanone. In this example, however, the chlorinated propanone monomer is added to the polymerizer and is dissolved by heating the solvent to 50° C. After the monomer has been dissolved, the solvent solution is cooled to $-73°$ C. and the reaction is thereafter conducted as described in Example 1, being carried out for a total time period of 4½ hours. During the reaction period, the reaction mixture warms gradually to 28° C. and is further warmed by heating to a final temperature of 80° C. After cooling the reaction mixture, the product precipitate is isolated, purified and dried as previously described. The white polymeric material recovered (34.8 g.) contains 6.4 mol percent of 1,3-dichloro-2-propanone units, as determined by elemental chlorine analysis. This product melts at approximately 145° C. When the copolymer is molded for 1 minute at 170° C. under 4000 p.s.i., the specimen moldings obtained are similar in appearance to the molded products of the previous examples, and are also substantially similar in physical properties.

It is to be understood that although the invention has been described with specific reference to particular embodiments thereof, it is not to be so limited, since changes and alterations therein may be made which are within the full intended scope of this invention as defined by the appended claims.

What is claimed is:
1. A process for preparing an oxymethylene copolymer composition which comprises copolymerizing in an inert organic liquid reaction medium under substantially anhydrous conditions, at a temperature within the range of $-80°$ C. to $+30°$ C., for a time period of 1 hour to 20 hours, and in the presence of from 0.001 to about 10 millimols per liter of reaction medium of an ionic polymerization catalyst selected from the group consisting of alkali metals, alkoxides of alkali metals and organometallic compounds selected from the group consisting of butyl lithium, diethyl zinc, tributyl boron, phenyl magnesium bromides and ethyl aluminum dichloride, formaldehyde and a halogenated propanone monomer having the structure

wherein X is halogen; Y is selected from the group consisting of hydrogen and halogen different from X; $a$ is 0 to 3, inclusive; and $b$ is 1 to 3, inclusive; and recovering a solid copolymer consisting essentially of from about 80 to 99.9 mol percent of recurring oxymethylene units and from about 0.1 to 20 mol percent of recurring units derived from the said halogenated propanone monomer.

2. The process of claim 1 is conducted at a temperature ranging from $-70°$ C. to $+10°$ C. for a time period of 2 to 5 hours.

3. The process of claim 1 in which the organic liquid reaction medium is selected from the group consisting of aliphatic, cycloaliphatic and aromatic hydrocarbons having from 3 to 12 carbon atoms per molecule.

4. The process of claim 1 in which the catalyst is an organometallic compound selected from the group consisting of butyl lithium, diethyl zinc, tributyl boron, phenyl magnesium bromides and ethyl aluminum dichloride.

5. The process of claim 1 in which the halogenated propanone monomer employed is hexafluoroacetone.

6. The process of claim 1 in which the halogenated propanone monomer employed is tetrafluorodichloroacetone.

7. The process of claim 1 in which the halogenated propanone monomer employed is 1,3-dichloro-2-propanone.

References Cited

UNITED STATES PATENTS

| 2,641,591 | 6/1953 | Gagarine | 260—64 |
| 2,683,133 | 7/1954 | Harvey et al. | 260—64 |
| 2,853,524 | 9/1958 | Miller et al. | 260—593.5 |
| 3,164,637 | 1/1965 | Nychka et al. | 260—593.5 |

WILLIAM H. SHORT, Primary Examiner

L. L. LEE, Assistant Examiner

U.S. Cl. X.R.

260—67